April 24, 1928. 1,666,938

F. KSELLMANN

BOWLING ALLEY MAT

Filed June 2, 1927

INVENTOR.
FRED KSELLMANN
BY Ely & Barrow
ATTORNEYS

Patented Apr. 24, 1928.

1,666,938

UNITED STATES PATENT OFFICE.

FRED KSELLMANN, OF AKRON, OHIO.

BOWLING-ALLEY MAT.

Application filed June 2, 1927. Serial No. 195,942.

This invention relates to bowling alleys and particularly to a floor covering for use in bowling alley pits.

The general purpose of the invention is to provide for use in a bowling alley pit a mat constructed to prevent the collection of dust and dirt on bowling balls in the pit and also one which will be capable of long wear and will not in any way mark or injure the balls or cause discomfort to the pin boys.

Particularly the invention is directed to a pit mat of tough, vulcanized rubber formed with reticulations or pockets in the surface thereof, preferably of inverted frusto-pyramidal formation, and the division walls between which at the upper surface of the mat are pointed to prevent collection of dust upon the upper surface of the mat. These walls, however, have downwardly diverging sides to provide a supporting body portion of considerable strength to resist the wear of balls and pins striking the same and walking of the pin boys thereover. These pockets are provided with small outlets at the bottom extending entirely through the mat so that under the vibratory action of the balls and pins hitting the rubber, the dirt and dust gradually work under the mat.

The foregoing and other objects of the invention are obtained by the pit mat illustrated in the accompanying drawings and described below. It is to be understood that the invention is not limited to the specific form thereof shown and described.

Figure 1:
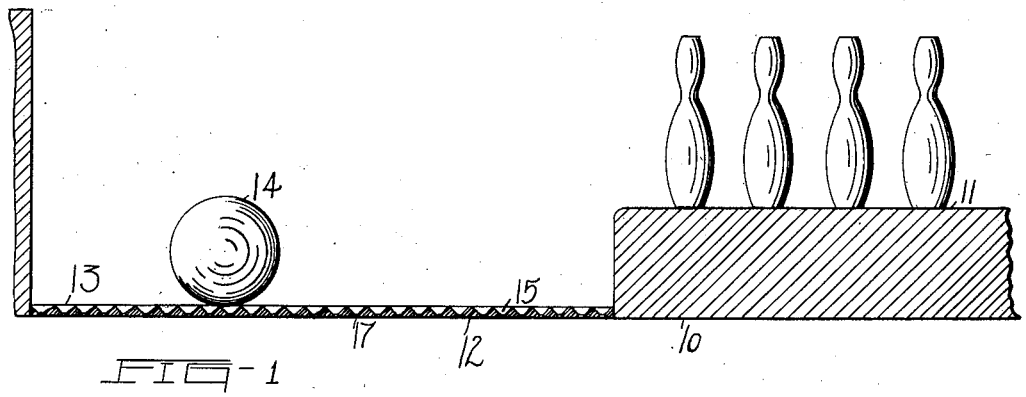
Figure 2:
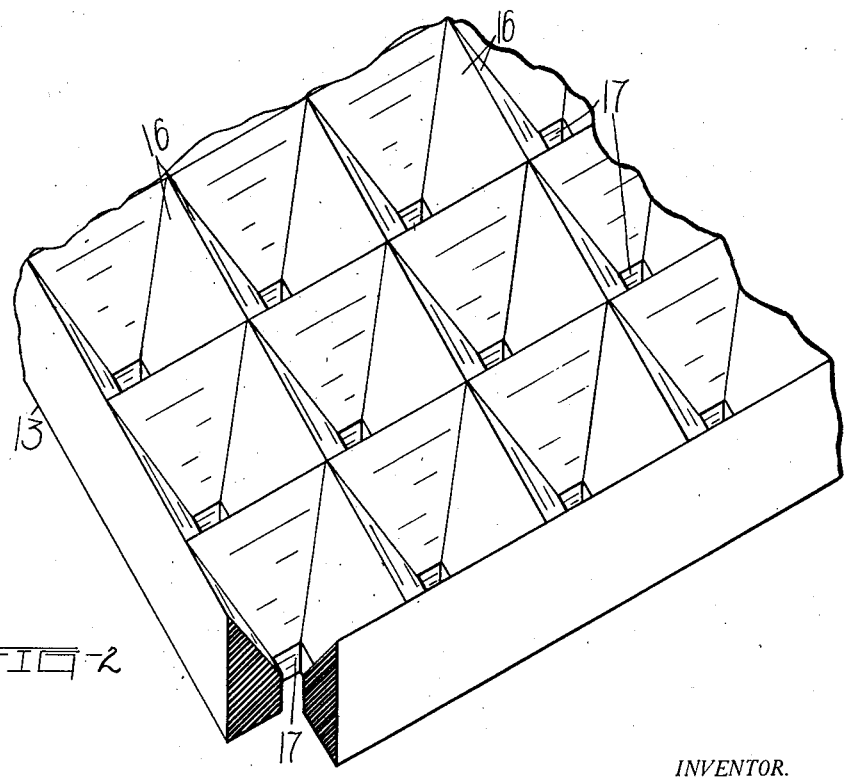

Of the accompanying drawings,

Figure 1 is a longitudinal section through a bowling alley pit in which the invention is embodied; and Figure 2 is a greatly enlarged perspective view of a portion of the mat illustrated in Figure 1 and partly broken away at one of the pockets or reticulations to show the construction thereof.

Referring to the drawings, the numeral 10 designates a bowling alley, the pins being indicated thereon at 11 and the usual pit at 12. In the pit is mounted a mat 13 constructed in accordance with the invention, a ball 14 being shown on the mat.

The mat 13 may be constructed in one or more pieces of a size such as to permit easy insertion thereof in or removal from the pit for purposes of cleaning the pit out occasionally.

As best shown in Figure 2, the mat is of reticulated, vulcanized rubber of about one inch thickness and formed with pockets 15, 15 preferably in the form of frustums of polygonal pyramids, the division walls 16, 16 being pointed at the top so as not to collect dust, but having widely diverging sides as shown to provide a substantial body of rubber to resist tearing and abrasion. The pockets have outlets 17, 17 in the bottom thereof through which dirt and dust can work under the mat under the vibratory action of the balls and pins falling upon the mat and the action due to pin boys walking thereon. These outlets are comparatively small so that while they permit dust working under the mat, the body of the mat prevents flying of dust in any considerable amount when a ball or pin strikes the mat.

By forming the mat of tough, resilient, vulcanized rubber, such as automobile tire tread stock, it is capable of long and effective use for the purpose described. It cannot be flattened or compacted so as soon to lose its dust eliminating characteristics as is the case with certain types of pit mats heretofore employed. The balls accordingly are returned for reuse without the usual collection of dirt and dust to soil the players' hands and clothes. The comparatively soft, resilient rubber of the mat furthermore does not in any way mark or injure the balls or pins.

The maximum dimensions of the pockets preferably should not be greater than an inch and a half so that the mat will be sturdy and also will present a walking surface comfortable to the pin boys. The thickness of the mat is substantial, and preferably at least an inch to provide the desired dust eliminating and cushioning qualities.

Modifications of the invention may be resorted to without departing from the spirit thereof or the scope of the appended claims.

What is claimed is:

1. A pit mat for bowling alleys, said mat being constructed of soft, tough, vulcanized rubber formed with reticulations defining pockets of frusto-pyramidal shape, the division walls therebetween being formed with acuminate upper edges so that dust cannot collect upon the upper surface of the mat, the sides of said walls diverging widely to provide a sturdy base portion, the bottoms of the pockets having open passages extending therefrom through the mat whereby dust collecting in the pockets may pass freely through the mat.

2. A pit mat for bowling alleys, said mat comprising closely spaced intersecting prisms of tough, resilient material affording comparatively close reticulations, said prisms being formed with comparatively wide supporting base portions and with sharp upper edges, the side walls of the prisms being inclined so that dust will slide to the bottom of the reticulations.

FRED KSELLMANN.